US009635711B1

(12) United States Patent
Govindassamy

(10) Patent No.: US 9,635,711 B1
(45) Date of Patent: Apr. 25, 2017

(54) MOBILE BROADBAND MANAGEMENT OVER PLURALITY OF OPERATING SYSTEMS AND MEDIA

(71) Applicant: MBIT WIRELESS, INC., Irvine, CA (US)

(72) Inventor: Sivakumar Govindassamy, Irvine, CA (US)

(73) Assignee: MBIT WIRELESS, INC., Irvine, CA (US)

(*) Notice: Subject to any disclaimer, the term of this patent is extended or adjusted under 35 U.S.C. 154(b) by 0 days.

(21) Appl. No.: 15/218,249

(22) Filed: Jul. 25, 2016

(51) Int. Cl.
*H04W 92/14* (2009.01)
*H04W 84/04* (2009.01)
*H04W 84/12* (2009.01)
*H04W 88/08* (2009.01)

(52) U.S. Cl.
CPC ......... *H04W 92/14* (2013.01); *H04W 84/042* (2013.01); *H04W 88/08* (2013.01); *H04W 84/12* (2013.01)

(58) Field of Classification Search
CPC ... H04W 92/14; H04W 84/042; H04W 88/08; H04W 84/12
USPC ................. 370/338, 401; 709/203
See application file for complete search history.

(56) References Cited

U.S. PATENT DOCUMENTS

| 8,751,670 | B2 * | 6/2014 | Xu | H04L 69/32 370/401 |
| 2006/0080402 | A1 * | 4/2006 | Han | H04L 69/16 709/217 |
| 2007/0140195 | A1 * | 6/2007 | Kaftan | H04L 29/1233 370/338 |
| 2012/0023243 | A1 * | 1/2012 | Xu | H04L 69/32 709/228 |
| 2013/0084836 | A1 * | 4/2013 | Guenkova-Luy | H04L 12/5692 455/414.1 |
| 2015/0212833 | A1 * | 7/2015 | Wang | G06F 9/44505 719/314 |
| 2016/0227471 | A1 * | 8/2016 | De Foy | H04W 4/001 |

OTHER PUBLICATIONS

3rd Generation Partnership Project (3GPP) Technical Specification 27.007, Jun. 2016, pp. 1-7.

* cited by examiner

*Primary Examiner* — Lewis West
(74) *Attorney, Agent, or Firm* — Lerner, David, Littenberg, Krumholz & Mentlik, LLP

(57) ABSTRACT

As the variety of client devices has increased and the demand for mobile broadband internet access has increased, a mobile Hotspot is commonly used. The mobile Hotspot device includes a modem for mobile broadband access and a Hotspot Access Point to distribute the internet to local devices. When accessing the internet through a mobile Hotspot, the client device may not have visibility on the status of the mobile network, the modem, and the USIM/UICC. A method and apparatus are disclosed that enable a client device to connect the mobile Hotspot as a virtual mobile broadband device over a local connection when a client device uses AT commands. This may be used to present detailed information to the user about the status of mobile network connection, the modem, and the USIM/UICC. This enables the user to configure and control the modem device functionality which may lead to improved user experience.

21 Claims, 18 Drawing Sheets

Virtual control Path Packet format

FIG. 13    1300

MOBILE BROADBAND MANAGEMENT OVER PLURALITY OF OPERATING SYSTEMS AND MEDIA

CROSS REFERENCE TO RELATED APPLICATIONS

The present application is related to U.S. patent application Ser. No. 14/989,137, filed Jan. 6, 2016, and U.S. patent application Ser. No. 15/244,547, filed Aug. 23, 2016, the disclosures of which are hereby incorporated herein by reference.

BACKGROUND

Internet access is becoming ubiquitous and the means by which the access is obtained varies widely. For example, the internet access may be through a Digital Subscriber Line (DSL), a cable modem, a fiber optic network, a wireless communication network, etc. When the internet service provides high data transfer rates it is often referred to as broadband internet service. Broadband internet service is generally understood to be a service that is always on and offers data transfer rates on the order of mega-bits per second for both download and upload.

A client device as defined in the present disclosure is a device that may use the internet from one or more of the sources from which internet service is available. Such client devices may include conventional client devices such as a smartphone, a tablet, a feature-phone, a laptop or desktop personal computer, etc. Other client devices may include devices that are embedded within devices that perform other functions. For example, an entertainment system in a home or in an automobile, a home appliance such as a refrigerator or washer/dryer, a wristwatch with a heart rate monitor, a medical device such as a blood pressure meter or insulin sensor, a utility meter, a gaming console, a camera, a navigation device, industrial equipment, etc., may include a client device. These types of devices may be collectively referred herein as machine type client devices.

These diverse types of client devices may access the internet service directly through one of the sources of primary internet access as mentioned earlier. Alternatively, a client device may access the internet through a local network, which may perform distribution of the primary internet access to the users localized in a given area. Examples of such local networks include Local Area Network (LAN) using Ethernet, Wireless LAN (WLAN) commonly known as Wi-Fi, or some other local area networking schemes. When a client device is in the proximity of a location where such a LAN or WLAN access is available, it may access the internet using the LAN or WLAN. FIG. 1 illustrates an example scenario of client devices accessing the internet over a WLAN network that is connected to a traditional wire-line internet service such as a DSL or a cable modem. The local area where WLAN service is available is often referred to as Hotspot. The device that offers the WLAN service in a given local area is referred to as an Access Point (AP). In the present disclosure, the terms Hotspot AP or Hotspot are used interchangeably to refer to the device that offers the WLAN service in a given local area.

A Hotspot AP may be connected to the DSL/cable modem through any of the standardized interfaces such as Universal Serial Bus (USB), Ethernet, or proprietary interfaces. In some cases, the DSL/cable modem and the Hotspot AP may be part of a single physical device. In such cases, the interface between the DSL/cable modem and AP may use Secure Digital Input Output (SDIO) or another suitable interface.

Client devices may also obtain internet access over mobile wireless networks. These mobile wireless networks are often referred to as Wireless Wide Area Network (WWAN). The internet service offered by such networks is often referred to as mobile broadband internet or Mobile Broadband (MB) and the mobile wireless networks are often referred to as mobile broadband networks. The terms WWAN and MB are used interchangeably herein.

As the variety of client devices has increased and the demand for MB access has increased, a device known as a mobile Hotspot is commonly used. A mobile Hotspot device includes both a modem for MB access and a WLAN AP (Hotspot AP) to distribute the internet to local client devices. FIG. 2 illustrates the block diagram of an example mobile Hotspot device. As shown in FIG. 2, for the chosen example, the MB modem and the Hotspot AP may be connected to each other via one of the standard interfaces used in the industry such as USB, SDIO, or proprietary interfaces. In another mobile Hotspot example, the MB modem and the WLAN AP may be an Integrated Circuit (IC) as shown in FIG. 3.

Some mobile Hotspot devices may serve as a single function device, i.e., they only perform the mobile Hotspot function. Such mobile Hotspots may take many different form factors such as a mobile Hotspot integrated into an automobile, a standalone device that may be carried around with or without a battery, integrated into an accessory device such as a tablet, a standalone device that may be powered by a power wall outlet, etc.

Some client devices have multiple capabilities and being a Hotspot is one of the capabilities. For example, a smartphone may have a mobile broadband modem that may be used to get mobile internet service directly from the mobile broadband network as illustrated in FIG. 4. The flow of data is as shown in FIG. 4 from the mobile broadband modem to the application processor that processes the download and upload data and interacts with the user via the display and other elements of the user interface such as audio, vibration, etc. The smartphone may also have a WLAN modem to access internet service over a Hotspot AP. When it is near a Hotspot AP, it may use internet service from the Hotspot as illustrated in FIG. 1. In another smartphone example, the mobile broadband modem, the WLAN AP and the Application Processor may be an integrated device as shown in FIG. 5.

A smartphone may also serve as a mobile Hotspot to provide internet service over WLAN to other client devices in its vicinity. FIG. 6 illustrates an example scenario where the smartphone serves as a mobile Hotspot and provides internet service to a client device that may have only a WLAN access. In another smartphone mobile hotspot example, the mobile broadband modem, the WLAN AP and the Application Processor may be integrated into a single IC as shown in FIG. 7.

A mobile Hotspot may be part of an accessory or peripheral device for a client device such as a tablet. Other examples of such accessory or peripheral device may include a standalone mouse, a battery pack, a cover, a stand or any other machine type client device. FIG. 8 illustrates an example scenario where a cover or a stand for a tablet includes mobile Hotspot connectivity. The mobile hotspot may be connected with the tablet client device using General Purpose Input/Output (GPIO) lines, Inter-Integrated Circuit (I2C) bus, Universal Asynchronous Receiver/Transmitter (UART), USB, SDIO, Bluetooth or any other standardized or proprietary interfaces. The data transfer and some of the control, such as power on/off, configuration, and notifications between client device and the mobile Hotspot may occur over the WLAN connection, or over any of the other available interface connection.

A client device may use a mobile Hotspot when internet access is required. A mobile Hotspot may be provided by a smartphone, by a single function mobile Hotspot device, or by an accessory such as a tablet cover that may include a mobile broadband modem and backup battery. A client device must continually search and choose the best Hotspot available.

FIG. 9 shows a block diagram 900 of example software architecture of a conventional client device for interfacing with a WLAN and with a WWAN when using an operating system (OS) that may use standard interface such as serial port or similar interface port referred herein as Modem AT Command Port (MATCP) to send and receive standard AT commands or non-standard AT commands. As shown in FIG. 9, the WLAN hardware (HW) block 902 may be controlled by the WLAN Device Driver block 904. The WLAN Device Driver block 904 may interface with the WLAN Application (APPLN) block 906. As shown in FIG. 9, if a WWAN HW (not shown) is connected to the client device, then it may be controlled by the MATCP Driver block 910 which may interface with the Radio Interface Layer (RIL) block 912. The RIL block 912 may be used by the MB User Interface Application (MB APPLN) block 914 to control the WWAN HW (not shown). The block diagram illustrates the control aspects of the interface with the WWAN HW. For the payload data such as pictures, videos, music, web pages, etc. to/from the MB User Interface Application 914, a conventional interface such as the Network Interface Card (NIC) may be used.

A typical client device may use a MATCP to send and receive the standard and non-standard AT commands between the MB device and the client device. The MB User Interface Application block 914 may use standard AT commands or user defined non-standard AT commands to communicate with the RIL block 912. The standard AT commands may be, for example, as per the 3$^{rd}$ Generation Partnership Project (3GPP) Technical Specification 27.007, June 2016, pgs. 1-7, incorporated by reference herein.

When a client device, such as a tablet, receives service from a mobile Hotspot, the quality of service may vary due to a number of factors such as the signal quality of wireless communication network which may fade because the user may be mobile, the congestion in the communication network, and the interruptions in data transfer during handovers, etc. Furthermore, the network access capability including roaming capability of the mobile Hotspot may be controlled by the contents of the Universal Subscriber Identity Module (USIM) that runs in the Universal Integrated Circuit Card (UICC). The UICC may be attached to the mobile broadband device such as the mobile Hotspot. The client device may not have direct access to it. Conventional client devices do not have the capability to access the wireless communication network status and the USIM/UICC status when accessing a MB network through a mobile Hotspot.

SUMMARY

A method and apparatus are disclosed that enable a client device to with connect the mobile Hotpot as a virtual mobile broadband device over the WLAN and through Virtual Modem AT Command Port (VMATCP), when the client device uses standard AT commands or user defined non-standard AT commands to communicate with the mobile Hotspot for obtaining the MB network status and other MB device details. This may be used to present more detailed information to the user about the MB network connection and that may lead to improved user experience.

In accordance with an aspect of the disclosure, a method for virtually connecting a mobile broadband (MB) device of a mobile hotspot device with a client device through a first interface of the client device may include controlling, by a processing device, creating a path for routing a command control flow related packet from a first device driver of the first interface to (i) a MB application via a Radio Interface Layer (RIL) of the client device, in which the RIL is for communicatively coupling the first device driver to the MB application, or (ii) an auxiliary MB application of the client device, wherein the path includes a Client Socket Interface and a Client Data Encoder/Decoder of a MB Client Service included in the client device, wherein the Client Socket Interface is for communicating with the first device driver, the Client Data Encoder/Decoder is for communicating with the Client Socket Interface and a Wireless Wide Area Network (WWAN) Interface Handler of the MB Client Service which is for communicating with the RIL via a Virtual Modem AT Command Port (VMATCP) of the client device, in which the VMATCP is for communicatively coupling with the RIL and the WWAN Interface Handler, in which the MB Client Service is for communicatively coupling the first driver with the MB application and the Auxiliary MB application, and communicating a given command control flow related packet between the first driver and the MB application or the auxiliary MB application, in which the given command control flow related packet has an AT command, a MB Interface Model (MBIM) Command ID (CID) or user defined format, controlling, by the processing device, encoding by the Client Data Encoder/Decoder, as a virtual control path (VCP) packet, a given control request packet routed from the first device driver to the MB Service through the Client Socket Interface, wherein the VCP packet includes an Interface Header (INTF HDR) part and an optional Payload part; and controlling, by the processing device, determining by the Encoder/Decoder whether the given control flow packet from the first interface encoded as the VCP packet is for WWAN interface, and based on the determination controlling communication of the VCP packet to the MB application or the Auxiliary MB application.

In one alternative, a given VCP packet communicated between the MB application and the RIL may have a standard or non-standard AT command format.

In one alternative, a given VCP packet communicated between the Auxiliary MB application and a Client Application Interface of the MB client service, in which the Client Application Interface is communicatively coupled to the Auxiliary MB application and the Client Data Encoder/Decoder, may have a standard or non-standard AT command format.

In one alternative, the VCP packet may have a MBIM Command, a non-MBIM command, a standard AT command or a non-standard AT command format.

In one alternative, the Interface Header part may include a one-byte Start of Frame (SOF) field with a fixed value of 0xFE (in hexadecimal notation), a two-byte length (LEN) field, a one-byte message identifier (MSG ID) field, a one-byte transaction identifier (TRNS ID) field, and three bytes reserved (RES) field for future use, and the payload may have a maximum length of 65535 bytes.

In one alternative, the Auxiliary MB application may be for communication of a given VCP packet having a standard AT command or a non-standard AT command mapped to and from a standard MBIM CID or non-standard MBIM CID.

In one alternative, the method may include controlling, by the processing device, (A) when a MBIM CID is determined to be encoded as the VCP packet, an AT Command Manager of the Encoder/Decoder to map the MBIM CID to an equivalent AT Command packet and provide the AT command packet for routing to the WWAN Interface Handler, wherein the WWAN Interface Handler routes the AT Command packet to a Virtual Modem AT Command Port (VMATCP) of the client device, which is communicatively coupled and routes the AT command packet to the RIL, wherein the RIL routes the AT command packet to the MB application; (B) when a given AT Command is determined to be encoded as the VCP packet, routing the VCP packet with the given AT Command by an AT Command Manager of the Encoder/Decoder to the WWAN interface handler, wherein the WWAN Interface Handler routes the VCP packet with the given AT Command to the VMATCP, which routes the VCP packet with the given AT Command to the RIL, wherein the RIL routes the VCP packet with the given AT Command to the MB application; (C) when a MBIM CID is determined to be encoded as the VCP packet and an AT command corresponding to an Auxiliary MBIM CID in the VCP packet is not supported by the RIL, routing the VCP packet with the AT command corresponding to the Auxiliary MBIM CID to the Client Application Interface, which routes the VCP packet with the AT command corresponding to the Auxiliary MBIM CID to the Auxiliary MB application; and (D) when a MBIM CID is determined to be encoded as the VCP packet, an AT command corresponding to an Auxiliary MBIM CID in the VCP packet is not supported by the RIL and the Auxiliary MB application supports MBIM CID format, the AT Command Manager not to perform mapping of the Auxiliary MBIM CID to the corresponding AT command and to route the VCP packet with the AT command corresponding to the Auxiliary MBIM CID to the Client application interface, which routes the VCP packet with the AT command corresponding to the Auxiliary MBIM CID to the Auxiliary MB application.

In one alternative, a Packet Router of the MS Client Service, which is communicatively coupled to the Decoder/Encoder and the WWAN Interface Handler, may extract a MB command from a given VCP packet and route a given command packet based on the extracting to the WWAN Interface Handler.

In one alternative, a Packet Router of the MS Client Service, which is communicatively coupled to the Decoder/Encoder and the WWAN Interface Handler, may route the AT command packet to the WWAN Interface Handler.

In one alternative, the method may include controlling, by the processing device, when the MB application sends a second AT command packet, routing the second AT command through the RIL and the VMATCP driver, to the WWAN Interface Handler, and from the WWAN Interface Handler to the Encoder/Decoder, mapping by the Encoder/Decoder the second AT command packet to a corresponding MBIM control flow packet, and routing the corresponding MBIM control flow packet through the Client Socket Interface to the first device driver.

In one alternative, a Packet Router of the MS Client Service, which is communicatively coupled with the Decoder/Encoder and the WWAN Interface Handler, may route the second AT command packet to the Encoder/Decoder.

In one alternative, the Auxiliary MB application may be configured to enable user interface configuration and provide Auxiliary MBIM CID related information.

In one alternative, the WWAN interface handler may interface with the VMATCP using device input output control protocols of an operating system (OS) of the mobile hotspot device.

In one alternative, the first interface may be a Wireless Local Area Network (WLAN), a Secure Digital Input Output (SDIO), a Universal Serial Bus (USB), a Universal Asynchronous Receiver/Transmitter, an Inter-Integrated Circuit (I2C) bus, or a General Purpose Input/Output (GPIO) lines interface.

In one alternative, the MB Application and the Auxiliary MB Application may be integrated into an enhanced MB Application.

In one alternative, the enhanced MB application and the RIL may be configured for communication of standard and non-standard AT commands.

In one alternative, the method may include controlling, by the processing device, routing a standard or non-standard AT command (Enhanced AT Command) from the Decoder/Encoder to the WWAN Interface Handler, and through the VTPTD and the RIL, to the enhanced MB application.

In one alternative, the method may include controlling, by the processing device, when the MB application transmits a control request, routing the control request to the WWAN interface handler via the RIL and the VMATPD, the WWAN interface handler routing the control request to the Encoder/Decoder, wherein the Encoder/Decoder transmits an encoded packet of the control request including an MBIM packet in VCP packet format to the Client Socket interface, which routes the encoded packet of the control request including the MBIM packet in VCP packet format to the first device driver; and when a control response packet encoded with a same VCP packet format as the encoded packet of the control request is received at the first driver, routing the control response packet to the Encoder/Decoder via the Client Socket interface, in which the Encoder/Decoder decodes the encoded control response packet and routes the decoded control response packet to the WWAN interface handler, in which the WWAN interface handler routes the decoded control response packet to the MB Application via the VMATCPD and the RIL.

In one alternative, a Packet Router of the MS Client Service, which is communicatively coupled to the Decoder/Encoder and the WWAN Handler, may route the control request from and the encoded control response to the WWAN Interface Handler.

In accordance with an aspect of the present disclosure, an apparatus for virtually connecting a mobile broadband (MB) device of a mobile hotspot device with a client device through a first interface of the client device may include circuitry configured to control: creating a path for routing a command control flow related packet from a first device driver of the first interface to (i) a MB application via a Radio Interface Layer (RIL) of the client device, in which the RIL is for communicatively coupling the first device driver to the MB application, or (ii) an auxiliary MB application of the client device, wherein the path includes a Client Socket Interface and a Client Data Encoder/Decoder of a MB Client Service included in the client device, wherein the Client Socket Interface is for communicating with the first device driver, the Client Data Encoder/Decoder is for communicating with the Client Socket Interface and a Wireless Wide Area Network (WWAN) Interface Handler of the MB Client Service which is for communicating with the RIL via a Virtual Modem AT Command Port (VMATCP) of the client device, in which the VMATCP is for communicatively coupling with the RIL and the WWAN Interface Handler, and in which the MB Client Service is for communicatively coupling the first driver with the MB application and the Auxiliary MB application, and communicating a given command control flow related packet between the first driver and the MB application or the auxiliary MB application, in which the given command control flow related packet has an AT command, a MB Interface Model (MBIM) Command ID (CID) or user defined format; encoding by the Client Data Encoder/Decoder, as a virtual control path (VCP) packet, a given control request packet routed from the first device driver to the MB Service through the Client Socket Interface, wherein the VCP packet includes an Interface Header (INTF HDR) part and an optional Payload part; and determining by the Encoder/Decoder whether the given control flow packet from the first interface encoded as the VCP packet is for WWAN interface, and based on the determination controlling communication of the VCP packet to the MB application or the Auxiliary MB application.

In accordance with an aspect of the present disclosure, a wireless communication device may include a receiver to receive a wireless communication; and a processing device configured for virtually connecting a mobile broadband (MB) device of a mobile hotspot device with the wireless communication device through a first interface of the wireless communication device. The processing device may be configured to control: creating a path for routing a command control flow related packet from a first device driver of the first interface to (i) a MB application via a Radio Interface Layer (RIL) of the wireless communication device, in which the RIL is for communicatively coupling the first device driver to the MB application, or (ii) an auxiliary MB application of the wireless communication device, wherein the path includes a Client Socket Interface and a Client Data Encoder/Decoder of a MB Client Service included in the wireless communication device, wherein the Client Socket Interface is for communicating with the first device driver, the Client Data Encoder/Decoder is for communicating with the Client Socket Interface and a Wireless Wide Area Network (WWAN) Interface Handler of the MB Client Service which is for communicating with the RIL via a Virtual Modem AT Command Port (VMATCP) of the wireless communication device, in which the VMATCP is for communicatively coupling with the RIL and the WWAN Interface Handler, and in which the MB Client Service is for communicatively coupling the first driver with the MB application and the Auxiliary MB application, and communicating a given command control flow related packet between the first driver and the MB application or the auxiliary MB application, in which the given command control flow related packet has an AT command, a MB Interface Model (MBIM) Command ID (CID) or user defined format; encoding by the Client Data Encoder/Decoder, as a virtual control path (VCP) packet, a given control request packet routed from the first device driver to the MB Service through the Client Socket Interface, wherein the VCP packet includes an Interface Header (INTF HDR) part and an optional Payload part; and determining by the Encoder/Decoder whether the given control flow packet from the first interface encoded as the VCP packet is for WWAN interface, and based on the determination controlling communication of the VCP packet to the MB application or the Auxiliary MB application.

DETAILED DESCRIPTION

Figure 1:
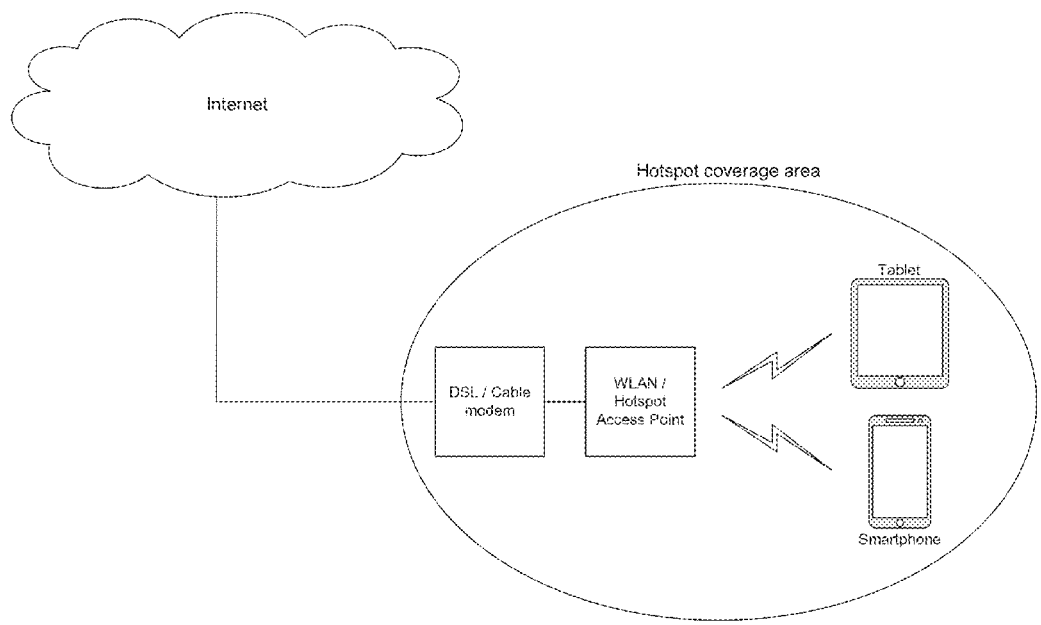
FIG. 1 illustrates an example scenario of internet access using WLAN network over a traditional wire-line internet service.
Figure 2:
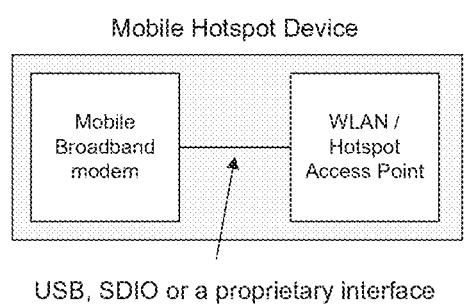
FIG. 2 illustrates a high-level block diagram of an example mobile Hotspot device.
Figure 3:
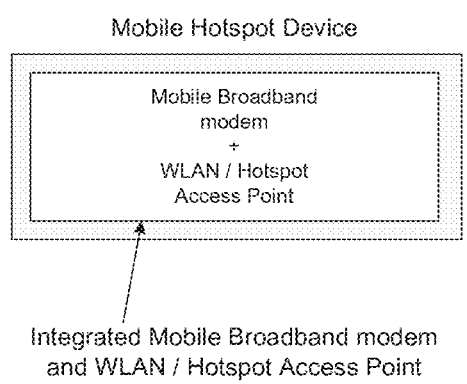
FIG. 3 illustrates a high-level block diagram of an example mobile Hotspot device with an integrated mobile broadband modem and WLAN Access Point.
Figure 4:
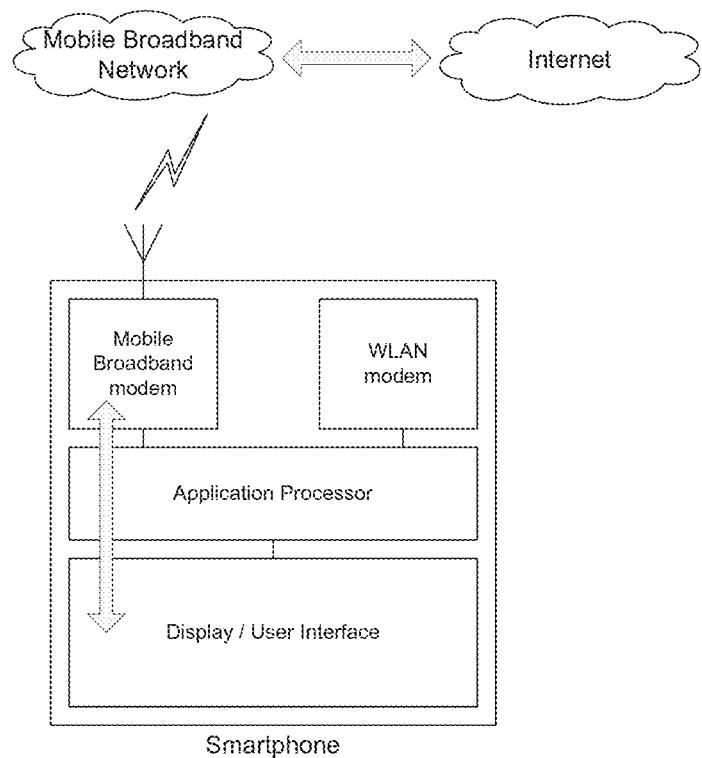
FIG. 4 illustrates a use case of internet access over a mobile broadband network by a smartphone client device.
Figure 5:
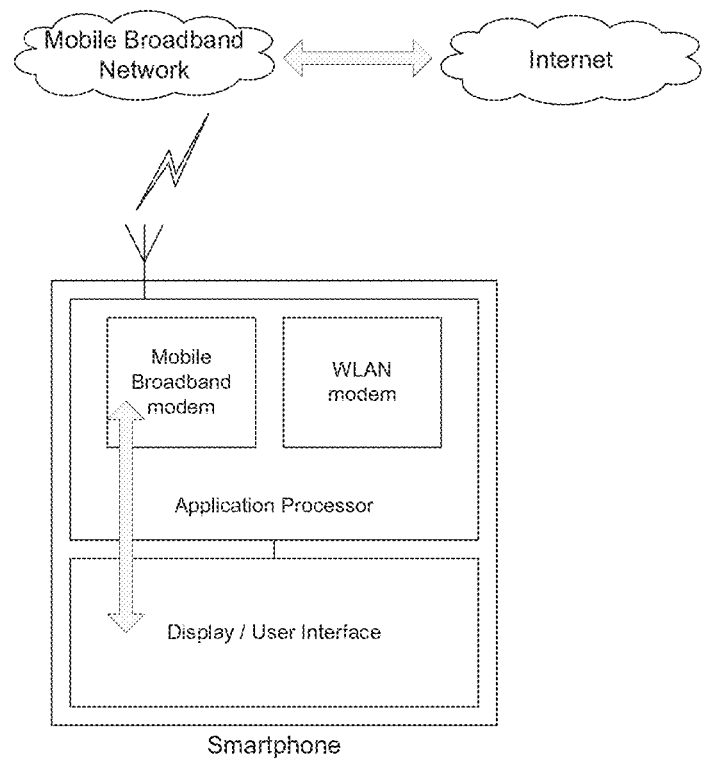
FIG. 5 illustrates a use case of internet access over a mobile broadband network by a smartphone client device with an integrated mobile broadband modem, WLAN Access Point, and Application Processor.
Figure 6:
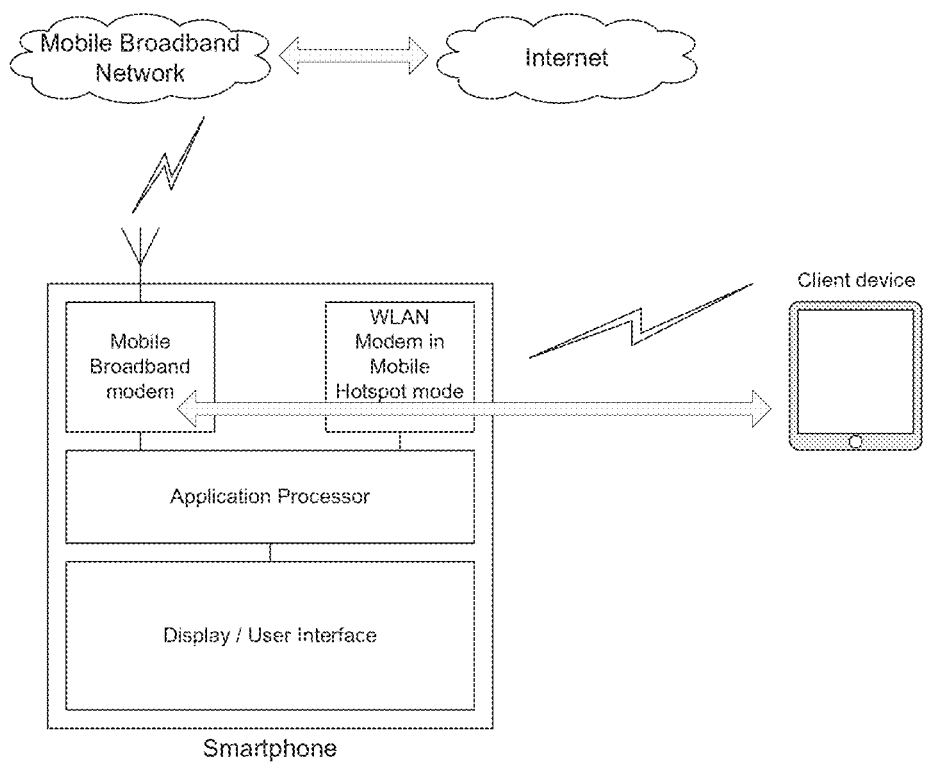
FIG. 6 illustrates a use case of internet access over a WLAN network by a client device through a smartphone operating in mobile Hotspot mode.
Figure 7:
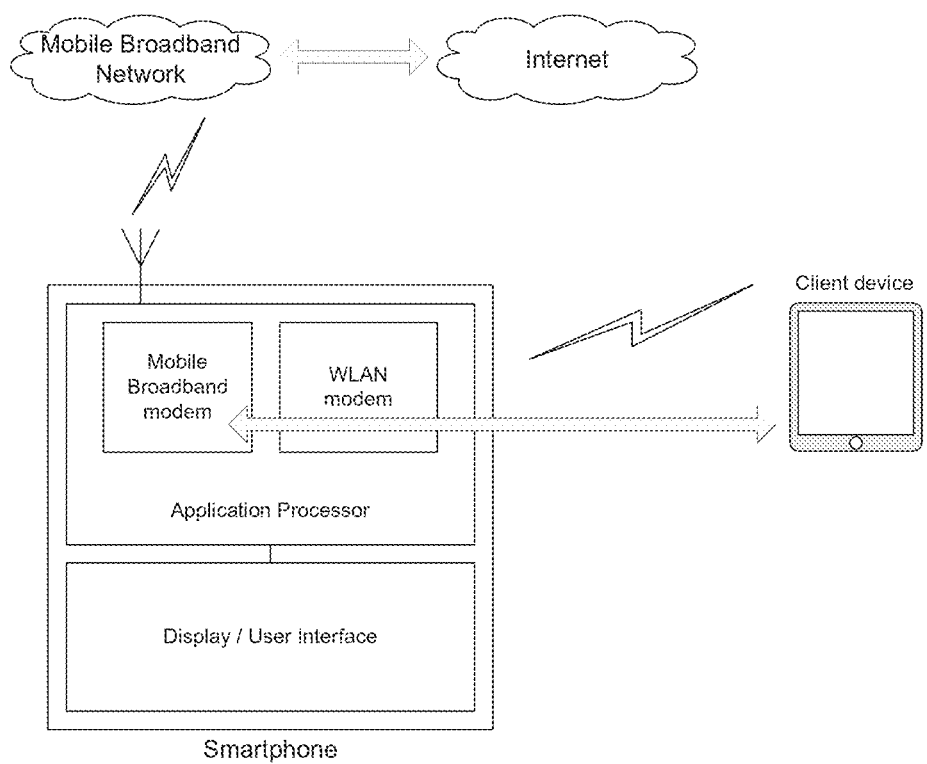
FIG. 7 illustrates a use case of internet access over a WLAN network by a client device through a smartphone operating in mobile Hotspot mode with an integrated mobile broadband modem, WLAN Access Point, and Application Processor.
Figure 8:
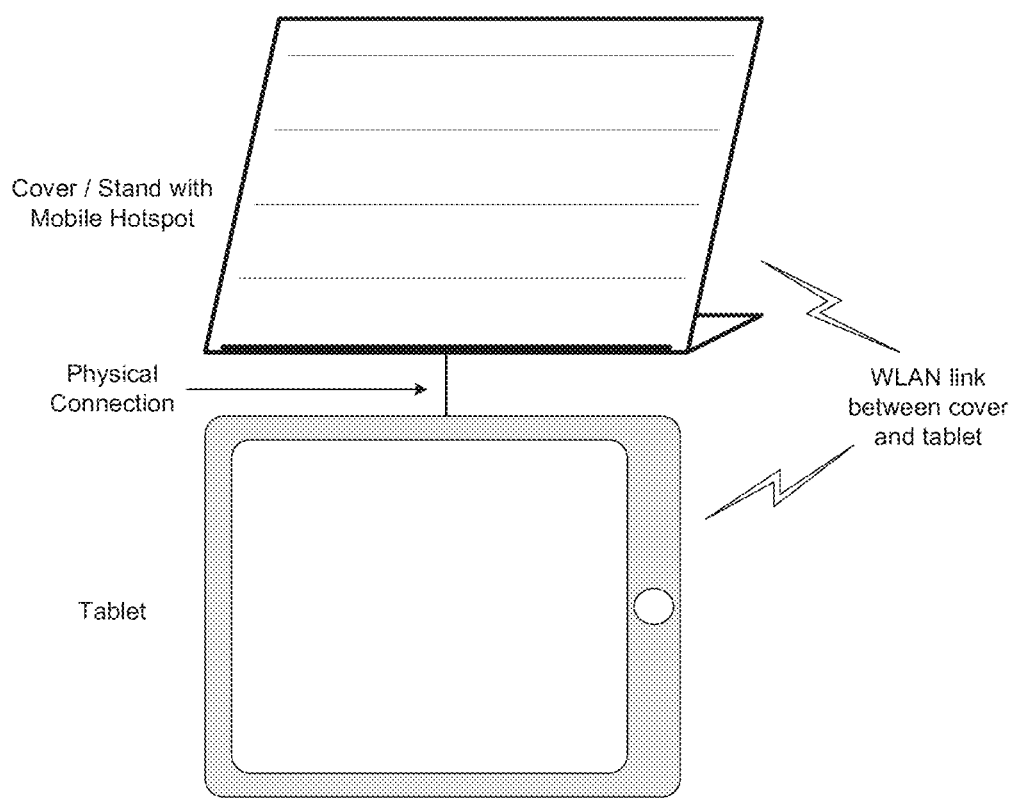
FIG. 8 illustrates a use case of tablet cover with mobile broadband modem offering internet access over a WLAN to a tablet client device and having a physical connection between the tablet and the cover.

The foregoing aspects, features and advantages of the present disclosure will be further appreciated when considered with reference to the following description of exemplary embodiments and accompanying drawings, wherein like reference numerals represent like elements. In describing the exemplary embodiments of the disclosure illustrated in the appended drawings, specific terminology will be used for the sake of clarity. However, the disclosure is not intended to be limited to the specific terms used.

Although aspects of the present disclosure are illustrated using a particular type of client devices, the disclosure is applicable to any type of client devices some of which are listed in an earlier section in the present disclosure.

The method disclosed in the present disclosure enables the integration of a mobile Hotspot device into a client device for sending and receiving the MB device status, notification, configuration and control using the standard AT commands and/or non-standard AT commands through a VMATCP.

Figure 10:
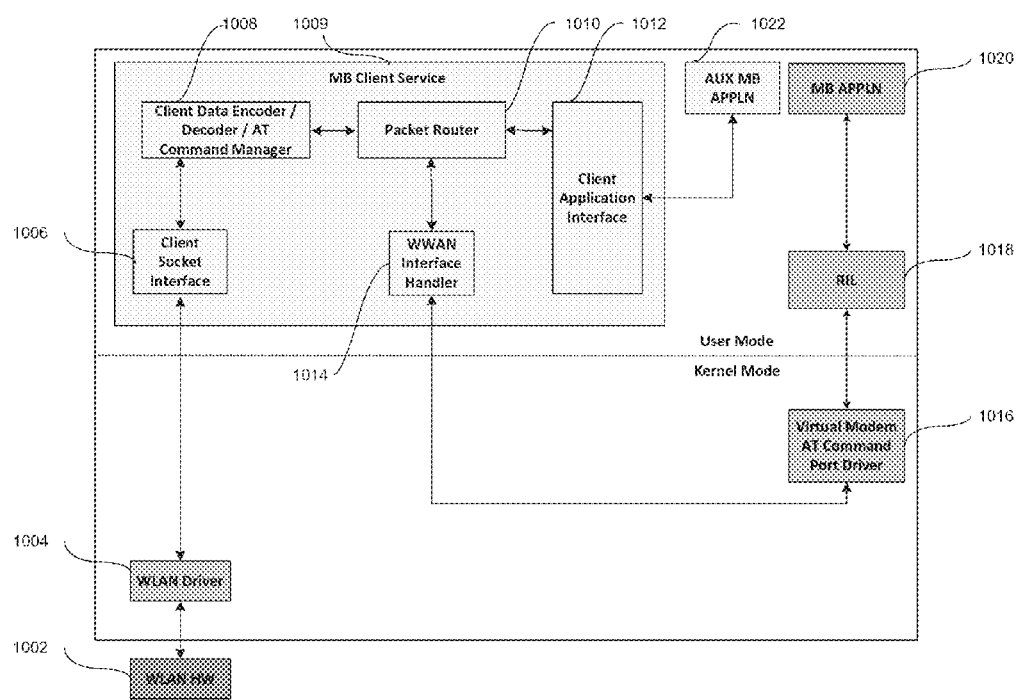
FIG. 10 illustrates software architecture for a virtual MATCP (VMATCP) interface through WLAN interface according to the aspects of the present disclosure.

FIG. 10 shows a block diagram 1000 of the software architecture of a client device according to the aspects of the present disclosure for virtually connecting a MB modem over a WLAN. According to an aspect of the present disclosure, the communication packets between the mobile Hotspot device and WLAN Device Driver block 1004 in the client device may be in the form of either AT commands or MBIM CIDs or any user defined command formats. According to the aspects of the present disclosure, a path for routing control flow related packets from the WLAN Device Driver block 1004 to the RIL block 1018 and the MB User Interface Application (MB APPLN) block 1020 and Auxiliary MB Application (AUX MB APPLN) block 1022 may be created although there is no MB device directly connected to the client device. The control flow related packets between the MB User Interface Application block 1020 and RIL block 1018 may be in the form of standard AT commands and/or non-standard AT commands. The control flow related packets between the AUX MB Application block 1022 and Client Application Interface block 1012 may be in the form of standard AT commands and/or non-standard AT commands According to the aspects of the present disclosure, a new subsystem referred herein as MB Client Service block 1009 is created which comprises the new processing blocks Client Socket Interface block 1006, Client Data Encoder/Decoder/ AT Command Manager block 1008, Packet Router 1010, the Client Application Interface block 1012, and WWAN Interface Handler block 1014.

Figure 11:
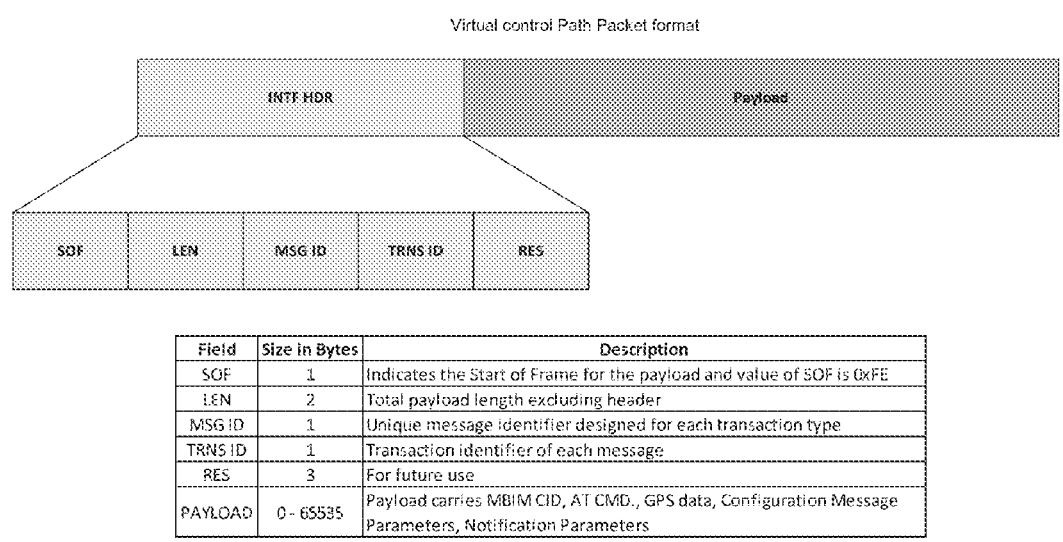
FIG. 11 illustrates the header format for mobile broadband network information transport over different media according to the aspects of the present disclosure.

According to an aspect of the present disclosure, the control request packets are encoded with a header format by the Client Data Encoder/Decoder/AT Command Manager block 1008 as shown in FIG. 11. According to the aspect of the present disclosure, the format comprises an Interface Header part (INTF HDR) and the Payload part. The Interface Header part further comprises a one-byte Start of Frame (SOF) field with a fixed value of 0xFE (in hexadecimal notation), a two-byte length (LEN) field, a one-byte message identifier (MSG ID) field, a one-byte transaction identifier (TRNS ID) field, and three bytes reserved (RES) field for future use. The payload part may be absent or present with a maximum length of 65535 bytes. According to an aspect of the present disclosure, a Mobile Broadband Interface Model (MBIM) or non-MBIM or standard AT commands or non-standard AT commands or user defined command formatted control path packet encoded using the format as described above is referred herein as Virtual Control Path (VCP) packet. A non-standard MBIM control path packet is referred herein as Auxiliary MBIM packet. The non-standard Command IDs (CIDs) associated with the Auxiliary MBIM packets are referred herein as Auxiliary MBIM CIDs. The AUX MB APPLN block 1022 may use standard AT commands or non-standard AT commands which may be mapped to and from standard MBIM CIDs or non-standard MBIM Command IDs respectively when communicating with mobile Hotspot device.

According to the aspects of the present disclosure, the WLAN Device Driver block 1004 interfaces with the Client Socket Interface block 1006. The VCP packets to and from the Hotspot device are routed by the WLAN Device Driver block 1004 to the Client Socket Interface block 1006. The Client Socket Interface block 1006 communicates with the Client Data Encoder/Decoder/AT Command Manager block 1008, which determines whether the VCP packet is for WWAN interface or for other purpose. According to the aspects of the present disclosure, the Packet Router 1010 extracts the MB packet embedded inside the VCP packet. If communication between the mobile Hotspot device and WLAN Device Driver block 1004 is in the form of MBIM CIDs, then the MBIM CIDs are mapped to equivalent AT commands by the Client Data Encoder/Decoder/AT Command Manager block 1008 and the AT command packets are routed to the WWAN Interface Handler block 1014. According to the aspects of the present disclosure, the "AT Command Manager" module present in the block 1008 may perform the mapping of the MBIM CIDs to the corresponding AT commands requests/responses/indications/configurations and presents them to the Packet Router block 1010 which routes the AT commands to the WWAN Interface Handler block 1014. The WWAN Interface Handler block 1014 sends the AT commands to the VMATCP Driver block 1016 which in turn provides them to the RIL block 1018. The RIL block 1018 interface sends the AT commands requests/responses/indications/configurations to the MB User Interface Application block 1020 using the AT commands format that is recognized by it. Similarly, when the MB User Interface Application block 1020 sends AT commands to the RIL block 1018, it may route them to the WWAN Interface Handler block 1014 through the VMATCP Driver block 1016. The Packet Router block 1010 routes the AT commands to the Client Data Encoder/Decoder/AT Command Manager block 1008 which maps the AT commands to the corresponding MBIM control flow packets.

According to the aspects of the present disclosure, if communication between the mobile Hotspot device and WLAN Device Driver block 1004 is in the form of AT commands, the "AT Command Manager" module present in the block 1008 may present directly the control flow packet related AT commands requests/responses/indications/configurations to the Packet Router block 1010 which routes them to the WWAN Interface Handler block 1014. The WWAN Interface Handler block 1014 sends the AT commands to the VMATCP Driver block 1016 which in turn sends the AT commands to the RIL block 1018. The RIL block 1018 interface sends the AT commands requests/responses/indications/configurations to MB User Interface Application block 1020 using the AT commands format that is recognized by it.

According to the aspect of the present disclosure if communication between the mobile Hotspot device and WLAN Device Driver block 1004 is in the form of MBIM CIDs, and the AT commands corresponding to the Auxiliary MBIM CIDs embedded in the VCP packet are not supported by the RIL block 1018, the AT commands corresponding to the Auxiliary MBIM packet is routed to the Client Application Interface block 1012. The Client Application Interface block 1012 in turn communicates with the AUX MB APPLN block 1022. The AUX MB APPLN block 1022 enables user interface configuration and provides notification of Auxiliary MBIM CID related indications.

According to the aspect of the present disclosure if communication between the mobile Hotspot device and WLAN Device Driver block 1004 is in the form of MBIM CIDs, and the AT commands corresponding to the Auxiliary MBIM CIDs embedded in the VCP packet are not supported by the RIL block 1018, and if the AUX MB APPLN supports the MBIM CID format then the "AT Command Manager" module present in the block 1008 may not perform the mapping of the Auxiliary MBIM CIDs to the corresponding AT commands and the Auxiliary MBIM CID packet may be routed to the Client Application Interface block 1012. The Client Application Interface block 1012 in turn communicates with the AUX MB APPLN block 1022. The AUX MB APPLN block 1022 enables user interface configuration and provides notification of Auxiliary MBIM CID related indications.

According to the aspects of the present disclosure, the new WWAN Interface Handler block 1014 interfaces with the Virtual Modem AT Command Port (VMATCP) Driver block 1016 using the device input output control protocols provided by the OS of the mobile hotspot device. Through these input output control protocol interface an application may communicate directly with the device driver.

According to an aspect of the present disclosure, the new block VMATCP Driver block 1016 interfaces with the RIL block 1018 and may make the remote mobile broadband device appear to the RIL as if it was locally attached to the client device. From this point forward the MB control packets from the WLAN Device Driver block 1004 are routed to the MB User Interface Application block 1020 as described earlier. This packet flow enables the MB User Interface Application to have a virtual MB device connected to it over a WLAN network. The MB User Interface Application block 1020 may be able to query the MB modem in the mobile Hotspot about the WWAN network conditions, USIM/UICC information, and other features as if having a MB modem virtually connected to the client device.

According to an aspect of the present disclosure, when the MB User Interface Application 1020 block sends a control request to the virtual MB device, the control request is re-directed to WWAN Interface Handler block 1014 using the packet flow path through the blocks 1018 and 1016. The WWAN Interface Handler block 1014 sends the control request to the Client Data Encoder/Decoder/AT Command Manager block 1008 through the Packet Router block 1010. The Client Data Encoder/Decoder/AT Command Manager block 1008 sends the encoded packet in VCP packet format to the Client Socket Interface block 1006, which in turn sends the VCP packet encapsulating the MBIM packet to the WLAN Device Driver block 1004. The control response from the mobile broadband modem is encoded with the same VCP packet format and sent to the client device over the WLAN interface. The VCP packet format encoded control response from the mobile broadband modem is decoded by the Client Data Encoder/Decoder/AT Command Manager block 1008 and the Packet Router block 1010 routes the control response to WWAN interface handler block 1014. The WWAN interface handler block 1014 sends the control response to RIL block 1018 through the VMATCP Driver block 1016. The RIL block 1018 eventually sends the control response to the MB APPLN block 1020. If the communication between the mobile Hotspot device and WLAN Device Driver block 1004 is in the form of MBIM CIDs, the Client Data Encoder/Decoder/AT Command Manager block 1008 may convert the MBIM CIDs into equivalent AT commands/responses.

Figure 12:
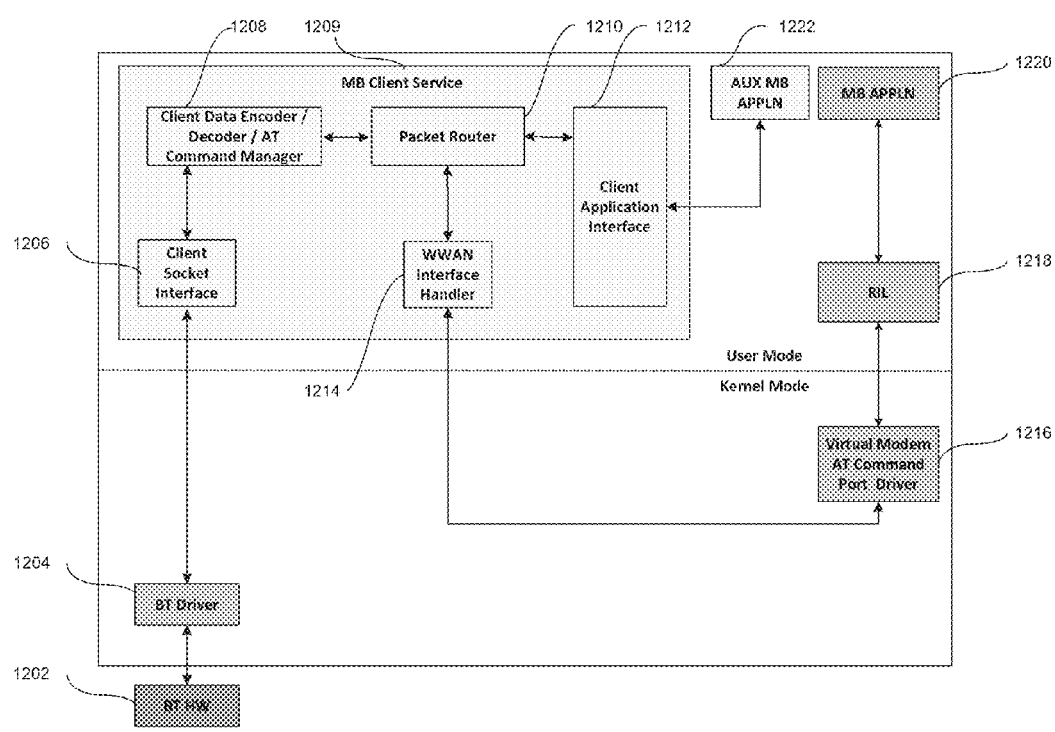
FIG. 12 illustrates software architecture for a virtual MATCP interface through Bluetooth interface according to the aspects of the present disclosure.
Figure 13:
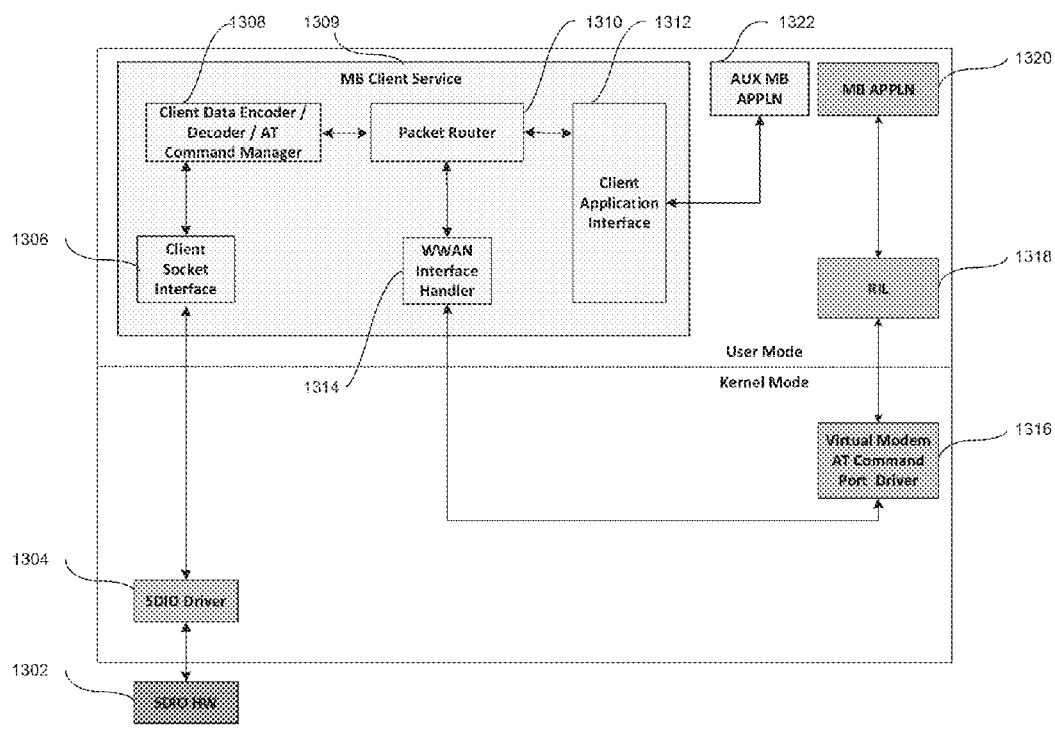
FIG. 13 illustrates software architecture for a virtual MATCP interface through SDIO interface according to the aspects of the present disclosure.
Figure 14:
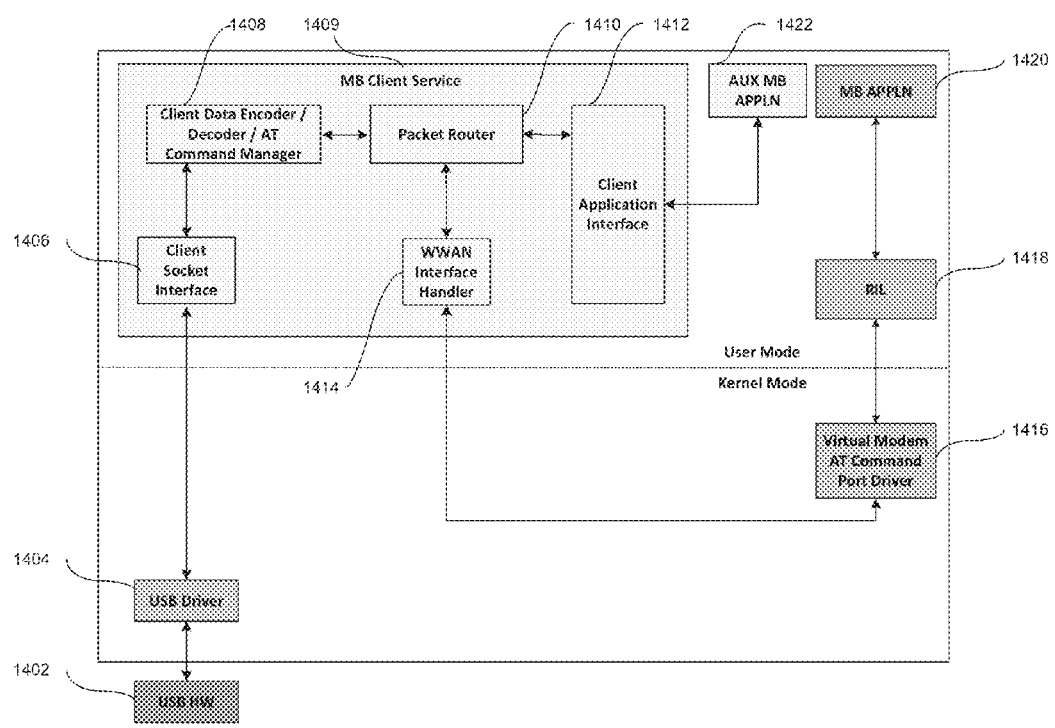
FIG. 14 illustrates software architecture for a virtual MATCP interface through USB interface according to the aspects of the present disclosure.
Figure 15:
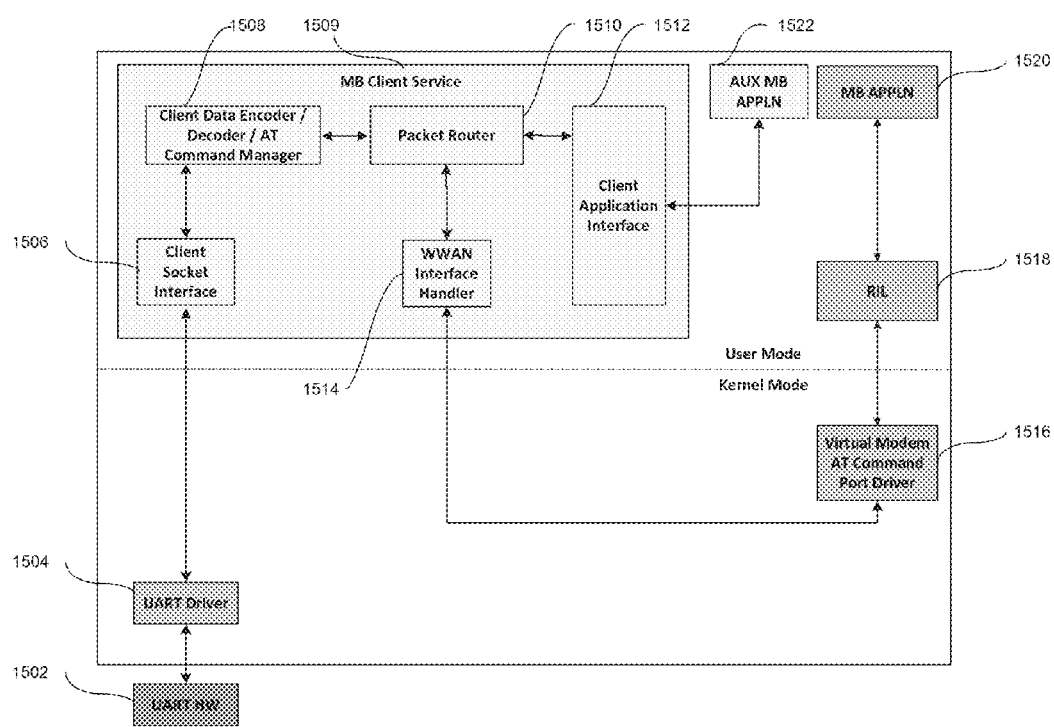
FIG. 15 illustrates software architecture for a virtual MATCP interface through UART interface according to the aspects of the present disclosure.
Figure 16:
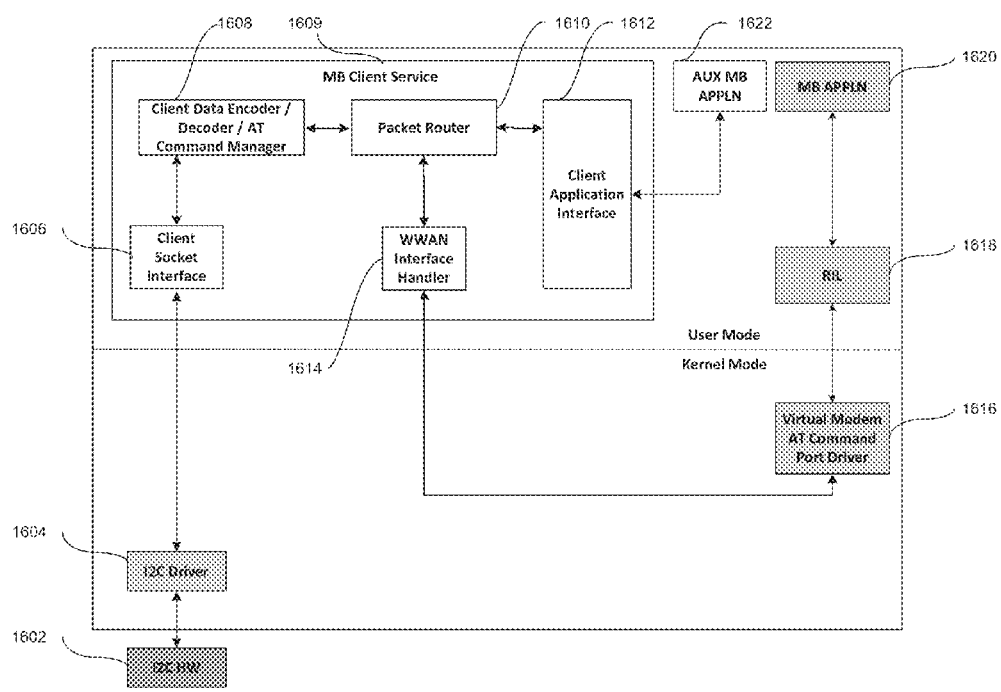
FIG. 16 illustrates software architecture for a virtual MATCP interface through I2C interface according to the aspects of the present disclosure.
Figure 17:
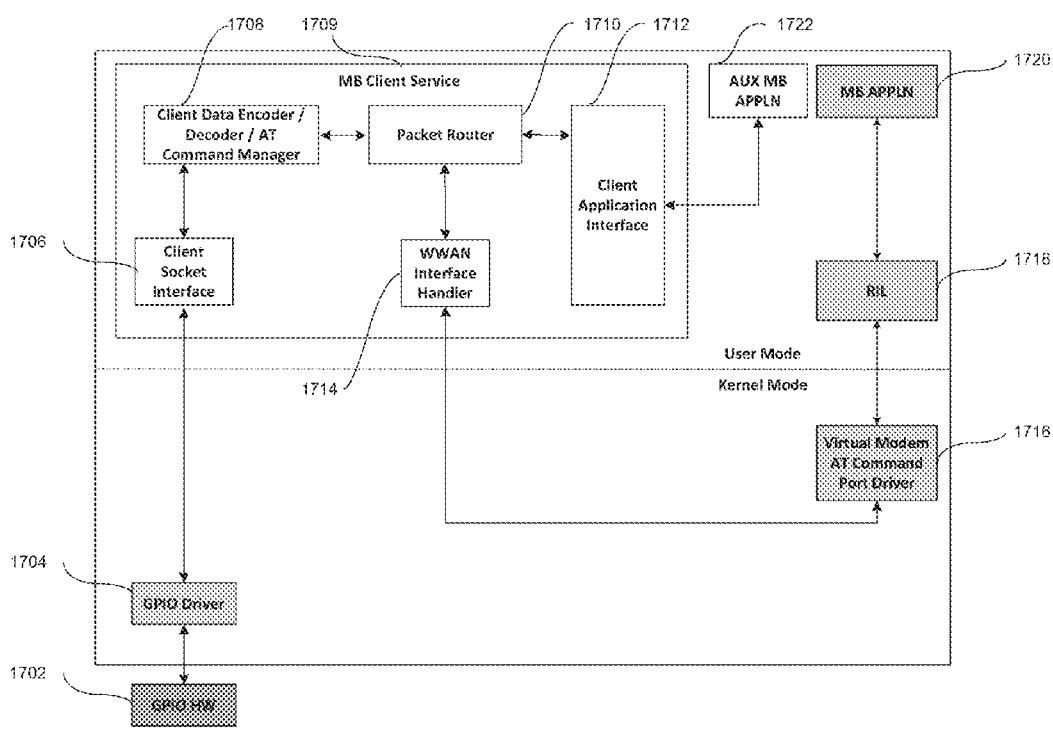
FIG. 17 illustrates software architecture for a virtual MATCP interface through GPIO interface according to the aspects of the present disclosure.

Although the description of the present disclosure for virtually connecting a MB modem to a client device is described using the WLAN interface as an example, the same function may be implemented using other interfaces. FIG. 12 shows a block diagram 1200 of the software architecture of a client device according to the aspects of the present disclosure for virtually connecting a MB modem over Bluetooth (BT) interface between the hotspot device and the client device. FIG. 13 shows a block diagram 1300 of the software architecture of a client device according to the aspects of the present disclosure for virtually connecting a MB modem over an SDIO interface between the hotspot device and the client device. FIG. 14 shows a block diagram 1400 of the software architecture of a client device according to the aspects of the present disclosure for virtually connecting a MB modem over a USB interface between the hotspot device and the client device. Note that although a MB modem with USB interface can directly connect to a client device, there may be devices such as a Customer Premise Equipment (CPE) that may have the MB modem embedded inside them but do not expose the MB modem directly to a client device. In this scenario, the client device may connect to a CPE through USB and then virtually connect to the MB modem inside the CPE according to the aspects of the present disclosure. FIG. 15 shows a block diagram 1500 of the software architecture of a client device according to the aspects of the present disclosure for virtually connecting a MB modem over a UART interface between the hotspot device and the client device. FIG. 16 shows a block diagram 1600 of the software architecture of a client device according to the aspects of the present disclosure for virtually connecting a MB modem over an I2C interface between the hotspot device and the client device. FIG. 17 shows a block diagram 1700 of the software architecture of a client device according to the aspects of the present disclosure for virtually connecting a MB modem over GPIO interface between the hotspot device and the client device. According to the aspects of the present disclosure, MB modem may be virtually connected to a client device over any standard based or proprietary communication interface.

Figure 9:
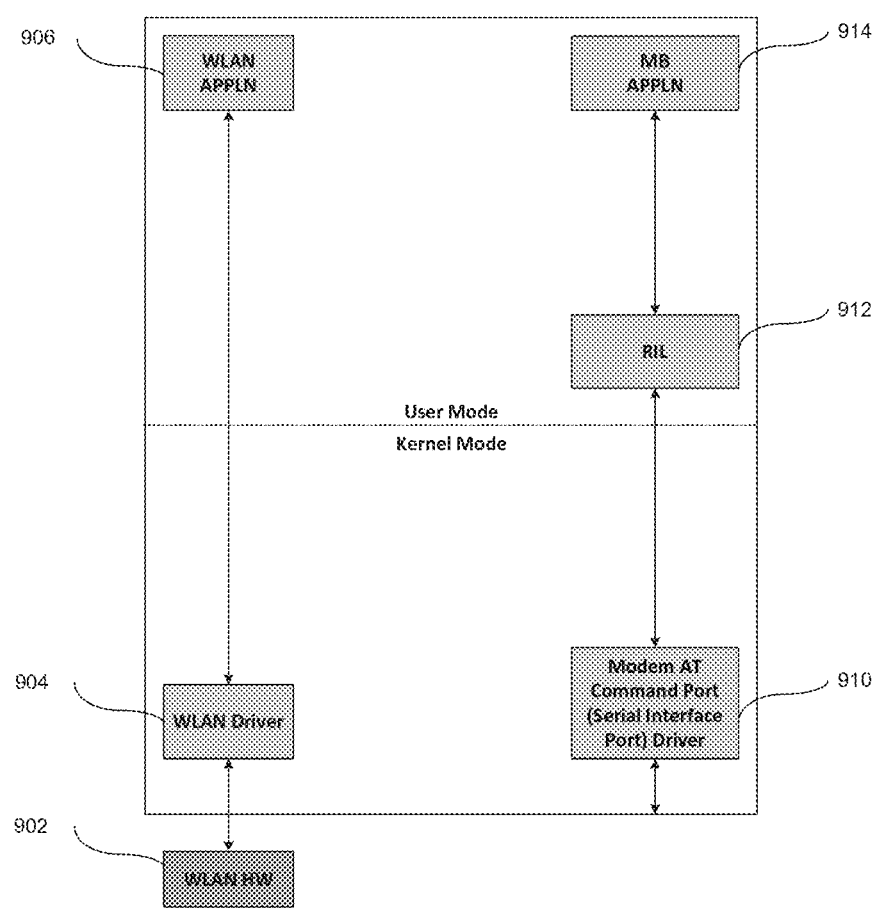
FIG. 9 illustrates conventional software architecture for a WLAN and Ethernet connection in a client device.
Figure 18:
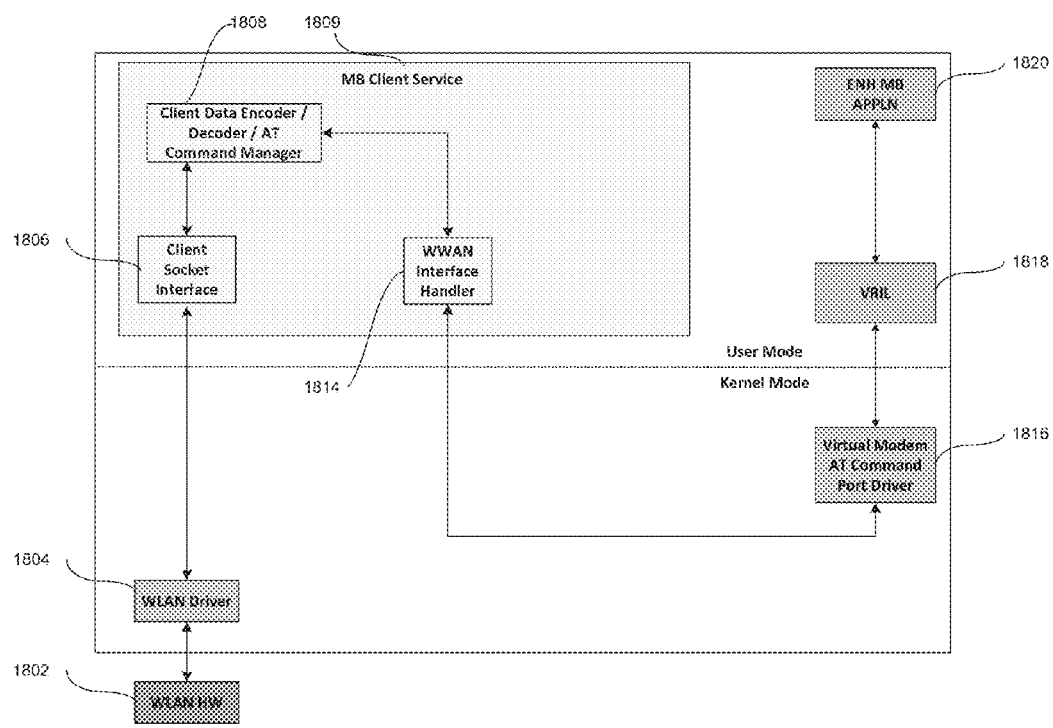
FIG. 18 illustrates software architecture for a virtual MATCP interface through WLAN interface with Enhanced MB User Interface Application and Vendor RIL and single common interface according to the aspects of the present disclosure.

According to another aspect of the present disclosure, the AUX MB APPLN block 1022 and the baseline MB APPLN block 1020 in FIG. 10 may be integrated into a new Enhanced MB User Interface Application (ENH MB APPLN) block 1820 as shown in FIG. 18. According to another aspect of the disclosure, the processing block Packet Router block 1010 and the processing block Client Application Interface block 1012 in FIG. 10 may be removed. As illustrated in FIG. 18, the Client Data Encoder/Decoder/AT Command Manager block 1808 may directly interface with WWAN Interface Handler block 1814. The ENH MB APPLN block 1820 may now communicate all the standard AT commands and the non-standard AT commands through a single common interface with the Vendor RIL (VRIL) block 1818. According to the aspects of the present disclosure, the standard AT commands and the non-standard AT commands may be collectively referred to as Enhanced AT commands According to the aspect of the present disclosure the VRIL may be extended to support the non-standard AT commands The mobile Hotspot may be initially configured using the client device. A client device may provide the required software drivers and updates to enable the mobile Hotspot to process the new non-standard MBIM CIDs or non-standard AT commands and other new message formats. The initial configuration of the mobile Hotspot may be done using the conventional method of communication between the mobile Hotspot and the client device as shown in FIG. 9. After the mobile Hotspot is configured, the client device may start using the new non-standard MBIM CIDs or new non-standard AT commands to virtually connect the mobile Hotspot to the client device over WLAN interface.

The invention claimed is:

1. A method for virtually connecting a mobile broadband (MB) device of a mobile hotspot device with a client device through a first interface of the client device, the method comprising:
controlling, by a processing device, creating a path for routing a command control flow related packet from a first device driver of the first interface to (i) a MB application via a Radio Interface Layer (RIL) of the client device, in which the RIL is for communicatively coupling the first device driver to the MB application, or (ii) an auxiliary MB application of the client device,
wherein the path includes a Client Socket Interface and a Client Data Encoder/Decoder of a MB Client Service included in the client device,
wherein the Client Socket Interface is for communicating with the first device driver, the Client Data Encoder/Decoder is for communicating with the Client Socket Interface and a Wireless Wide Area Network (WWAN) Interface Handler of the MB Client Service which is for communicating with the RIL via a Virtual Modem AT Command Port (VMATCP) of the client device, in which the VMATCP is for communicatively coupling with the RIL and the WWAN Interface Handler,
in which the MB Client Service is for communicatively coupling the first driver with the MB application and the Auxiliary MB application, and communicating a given command control flow related packet between the first driver and the MB application or the auxiliary MB application, in which the given command control flow related packet has an AT command, a MB Interface Model (MBIM) Command ID (CID) or user defined format,
controlling, by the processing device, encoding by the Client Data Encoder/Decoder, as a virtual control path (VCP) packet, a given control request packet routed from the first device driver to the MB Service through the Client Socket Interface, wherein the VCP packet includes an Interface Header (INTF HDR) part and an optional Payload part; and
controlling, by the processing device, determining by the Encoder/Decoder whether the given control flow packet from the first interface encoded as the VCP packet is for WWAN interface, and based on the determination controlling communication of the VCP packet to the MB application or the Auxiliary MB application.

2. The method of claim 1, wherein a given VCP packet communicated between the MB application and the RIL has a standard or non-standard AT command format.

3. The method of claim 1, wherein a given VCP packet communicated between the Auxiliary MB application and a Client Application Interface of the MB client service, in which the Client Application Interface is communicatively coupled to the Auxiliary MB application and the Client Data Encoder/Decoder, has a standard or non-standard AT command format.

4. The method of claim 1, wherein the VCP packet has a MBIM Command, a non-MBIM command, a standard AT command or a non-standard AT command format.

5. The method of claim 1,
wherein the Interface Header part includes a one-byte Start of Frame (SOF) field with a fixed value of 0xFE (in hexadecimal notation), a two-byte length (LEN) field, a one-byte message identifier (MSG ID) field, a one-byte transaction identifier (TRNS ID) field, and three bytes reserved (RES) field for future use, and
wherein the payload has a maximum length of 65535 bytes.

6. The method of claim 1, wherein the Auxiliary MB application is for communication of a given VCP packet having a standard AT command or a non-standard AT command mapped to and from a standard MBIM CID or non-standard MBIM CID.

7. The method of claim 1, further comprising:
controlling, by the processing device,
(A) when a MBIM CID is determined to be encoded as the VCP packet, an AT Command Manager of the Encoder/Decoder to map the MBIM CID to an equivalent AT Command packet and provide the AT command packet for routing to the WWAN Interface Handler,
wherein the WWAN Interface Handler routes the AT Command packet to a Virtual Modem AT Command Port (VMATCP) of the client device, which is communicatively coupled and routes the AT command packet to the RIL, wherein the RIL routes the AT command packet to the MB application;
(B) when a given AT Command is determined to be encoded as the VCP packet, routing the VCP packet with the given AT Command by an AT Command Manager of the Encoder/Decoder to the WWAN interface handler,
wherein the WWAN Interface Handler routes the VCP packet with the given AT Command to the VMATCP, which routes the VCP packet with the given AT Command to the RIL, wherein the RIL routes the VCP packet with the given AT Command to the MB application;
(C) when a MBIM CID is determined to be encoded as the VCP packet and an AT command corresponding to an Auxiliary MBIM CID in the VCP packet is not supported by the RIL, routing the VCP packet with the AT command corresponding to the Auxiliary MBIM CID to the Client Application Interface, which routes the VCP packet with the AT command corresponding to the Auxiliary MBIM CID to the Auxiliary MB application; and
(D) when a MBIM CID is determined to be encoded as the VCP packet, an AT command corresponding to an Auxiliary MBIM CID in the VCP packet is not supported by the RIL and the Auxiliary MB application supports MBIM CID format, the AT Command Manager not to perform mapping of the Auxiliary MBIM CID to the corresponding AT command and to route the VCP packet with the AT command corresponding to the Auxiliary MBIM CID to the Client application interface, which routes the VCP packet with the AT command corresponding to the Auxiliary MBIM CID to the Auxiliary MB application.

8. The method of claim 1, wherein a Packet Router of the MS Client Service, which is communicatively coupled to the Decoder/Encoder and the WWAN Interface Handler, extracts a MB command from a given VCP packet and routes a given command packet based on the extracting to the WWAN Interface Handler.

9. The method of claim 7, wherein a Packet Router of the MS Client Service, which is communicatively coupled to the Decoder/Encoder and the WWAN Interface Handler, routes the AT command packet to the WWAN Interface Handler.

10. The method of claim 7, further comprising:
controlling, by the processing device,
when the MB application sends a second AT command packet, routing the second AT command through the RIL and the VMATCP driver, to the WWAN Interface Handler, and from the WWAN Interface Handler to the Encoder/Decoder,
mapping by the Encoder/Decoder the second AT command packet to a corresponding MBIM control flow packet, and
routing the corresponding MBIM control flow packet through the Client Socket Interface to the first device driver.

11. The method of claim 10, wherein a Packet Router of the MS Client Service, which is communicatively coupled with the Decoder/Encoder and the WWAN Interface Handler, routes the second AT command packet to the Encoder/Decoder.

12. The method of claim 1, wherein the Auxiliary MB application is configured to enable user interface configuration and provide Auxiliary MBIM CID related information.

13. The method of claim 1, wherein the WWAN interface handler interfaces with the VMATCP using device input output control protocols of an operating system (OS) of the mobile hotspot device.

14. The method of claim 1, wherein the first interface is a Wireless Local Area Network (WLAN), a Secure Digital Input Output (SDIO), a Universal Serial Bus (USB), a Universal Asynchronous Receiver/Transmitter, an Inter-Integrated Circuit (I2C) bus, or a General Purpose Input/Output (GPIO) lines interface.

15. The method of claim 1,
wherein the MB Application and the Auxiliary MB Application are integrated into an enhanced MB Application.

16. The method of claim 15,
wherein the enhanced MB application and the RIL are configured for communication of standard and non-standard AT commands.

17. The method of claim 15, further comprising:
controlling, by the processing device, routing a standard or non-standard AT command (Enhanced AT Command) from the Decoder/Encoder to the WWAN Interface Handler, and through the VTPTD and the RIL, to the enhanced MB application.

18. The method of claim 1, further comprising:
controlling, by the processing device,
when the MB application transmits a control request, routing the control request to the WWAN interface handler via the RIL and the VMATPD, the WWAN interface handler routing the control request to the Encoder/Decoder, wherein the Encoder/Decoder transmits an encoded packet of the control request including an MBIM packet in VCP packet format to the Client Socket interface, which routes the encoded packet of the control request including the MBIM packet in VCP packet format to the first device driver; and
when a control response packet encoded with a same VCP packet format as the encoded packet of the control request is received at the first driver, routing the control response packet to the Encoder/Decoder via the Client Socket interface, in which the Encoder/Decoder decodes the encoded control response packet and routes the decoded control response packet to the WWAN interface handler, in which the WWAN interface handler routes the decoded control response packet to the MB Application via the VMATCPD and the RIL.

19. The method of claim 18, wherein a Packet Router of the MS Client Service, which is communicatively coupled to the Decoder/Encoder and the WWAN Handler, routes the control request from and the encoded control response to the WWAN Interface Handler.

20. An apparatus for virtually connecting a mobile broadband (MB) device of a mobile hotspot device with a client device through a first interface of the client device, the apparatus comprising:
circuitry configured to control:
creating a path for routing a command control flow related packet from a first device driver of the first interface to (i) a MB application via a Radio Interface Layer (RIL) of the client device, in which the RIL is for communicatively coupling the first device driver to the MB application, or (ii) an auxiliary MB application of the client device,
wherein the path includes a Client Socket Interface and a Client Data Encoder/Decoder of a MB Client Service included in the client device,
wherein the Client Socket Interface is for communicating with the first device driver, the Client Data Encoder/Decoder is for communicating with the Client Socket Interface and a Wireless Wide Area Network (WWAN) Interface Handler of the MB Client Service which is for communicating with the RIL via a Virtual Modem AT Command Port (VMATCP) of the client device, in which the VMATCP is for communicatively coupling with the RIL and the WWAN Interface Handler, and
in which the MB Client Service is for communicatively coupling the first driver with the MB application and the Auxiliary MB application, and communicating a given command control flow related packet between the first driver and the MB application or the auxiliary MB application, in which the given command control flow related packet has an AT command, a MB Interface Model (MBIM) Command ID (CID) or user defined format;
encoding by the Client Data Encoder/Decoder, as a virtual control path (VCP) packet, a given control request packet routed from the first device driver to the MB Service through the Client Socket Interface, wherein the VCP packet includes an Interface Header (INTF HDR) part and an optional Payload part; and
determining by the Encoder/Decoder whether the given control flow packet from the first interface encoded as the VCP packet is for WWAN interface, and based on the determination controlling communication of the VCP packet to the MB application or the Auxiliary MB application.

21. A wireless communication device comprising:
a receiver to receive a wireless communication; and
a processing device configured for virtually connecting a mobile broadband (MB) device of a mobile hotspot device with the wireless communication device through a first interface of the wireless communication device,
wherein the processing device is configured to control:
creating a path for routing a command control flow related packet from a first device driver of the first interface to (i) a MB application via a Radio Interface Layer (RIL)

of the wireless communication device, in which the RIL is for communicatively coupling the first device driver to the MB application, or (ii) an auxiliary MB application of the wireless communication device, wherein the path includes a Client Socket Interface and a Client Data Encoder/Decoder of a MB Client Service included in the wireless communication device, wherein the Client Socket Interface is for communicating with the first device driver, the Client Data Encoder/Decoder is for communicating with the Client Socket Interface and a Wireless Wide Area Network (WWAN) Interface Handler of the MB Client Service which is for communicating with the RIL via a Virtual Modem AT Command Port (VMATCP) of the wireless communication device, in which the VMATCP is for communicatively coupling with the RIL and the WWAN Interface Handler, and in which the MB Client Service is for communicatively coupling the first driver with the MB application and the Auxiliary MB application, and communicating a given command control flow related packet between the first driver and the MB application or the auxiliary MB application, in which the given command control flow related packet has an AT command, a MB Interface Model (MBIM) Command ID (CID) or user defined format;

encoding by the Client Data Encoder/Decoder, as a virtual control path (VCP) packet, a given control request packet routed from the first device driver to the MB Service through the Client Socket Interface, wherein the VCP packet includes an Interface Header (INTF HDR) part and an optional Payload part; and determining by the Encoder/Decoder whether the given control flow packet from the first interface encoded as the VCP packet is for WWAN interface, and based on the determination controlling communication of the VCP packet to the MB application or the Auxiliary MB application.

* * * * *